(12) United States Patent
Nakanishi et al.

(10) Patent No.: US 10,234,304 B2
(45) Date of Patent: Mar. 19, 2019

(54) MAP INFORMATION CREATING DEVICE, NAVIGATION SYSTEM, INFORMATION DISPLAY METHOD, INFORMATION DISPLAY PROGRAM, AND RECORDING MEDIUM

(71) Applicants: Toyota Mapmaster Incorporated, Nagoya-shi (JP); Toyota Jidosha Kabushiki Kaisha, Toyota-shi (JP)

(72) Inventors: Kenta Nakanishi, Nagoya (JP); Satoru Deguchi, Nagoyga (JP); Atsushi Inoue, Toyota (JP); Kazuhito Baba, Nagoya (JP)

(73) Assignees: Toyota Mapmaster Incorporated (JP); Toyota Jidosha Kabushiki Kaisha (JP)

( * ) Notice: Subject to any disclaimer, the term of this patent is extended or adjusted under 35 U.S.C. 154(b) by 101 days.

(21) Appl. No.: 15/459,177

(22) Filed: Mar. 15, 2017

(65) Prior Publication Data
US 2017/0268899 A1 Sep. 21, 2017

(30) Foreign Application Priority Data
Mar. 17, 2016 (JP) .................................. 2016-053429

(51) Int. Cl.
*G01C 21/36* (2006.01)
*G06F 17/30* (2006.01)

(52) U.S. Cl.
CPC ..... *G01C 21/3682* (2013.01); *G01C 21/3614* (2013.01); *G06F 17/30241* (2013.01)

(58) Field of Classification Search
CPC ......... G01C 21/32; G01C 21/34; G01C 21/36
(Continued)

(56) References Cited

U.S. PATENT DOCUMENTS 8,041,335 B2 * 10/2011 Khetawat .............. H04L 63/104
455/404.2
2009/0091439 A1 * 4/2009 Sekiyama .......... G01C 21/3697
340/459
(Continued)

FOREIGN PATENT DOCUMENTS

JP 2004-078919 3/2004
JP 2005-214783 8/2005
(Continued)

OTHER PUBLICATIONS

Notification of Reasons for Refusal dated Sep. 26, 2017, of corresponding Japanese Application No. 2016-053429, along with an English translation.

*Primary Examiner* — Thomas G Black
*Assistant Examiner* — Wae L Louie
(74) *Attorney, Agent, or Firm* — DLA Piper LLP (US)

(57) ABSTRACT

A map information navigation system includes: a storage unit that stores POI data including point data about a POI, node data of nodes set on roads in advance, and link data of links connecting neighboring nodes; a specification unit that specifies one link located at a shortest distance from the POI among the links for each of a plurality of directions; a determination unit that sets one of the nodes included in the specified links as a specific point and determines a predetermined area centered on the POI and passing through the specific point as a presentation target range of map information; an acquisition unit that acquires current position information indicating a current position; and a presentation unit that presents POI data including the point data about the POI with entrance of the current position into the presentation target range as a trigger.

9 Claims, 7 Drawing Sheets

(58) Field of Classification Search
USPC .................................. 701/410, 446, 533, 527
See application file for complete search history.

(56) References Cited

U.S. PATENT DOCUMENTS

| | | |
|---|---|---|
| 2011/0258872 A1 | 10/2011 | Kim et al. |
| 2013/0173152 A1* | 7/2013 | Schilling ................. H03M 7/40 701/527 |
| 2014/0107917 A1* | 4/2014 | Kazawa ............. G01O 21/3682 701/426 |
| 2014/0163872 A1* | 6/2014 | Schilling ................. G01C 21/32 701/527 |
| 2017/0268893 A1* | 9/2017 | Nakanishi .......... G01C 21/3476 |
| 2017/0268899 A1* | 9/2017 | Nakanishi .......... G01C 21/3682 |

FOREIGN PATENT DOCUMENTS

| | | |
|---|---|---|
| JP | 2007-40721 | 2/2007 |
| JP | 2007-78367 | 3/2007 |
| JP | 2011-22077 | 2/2011 |
| JP | 2011-58960 A | 3/2011 |
| JP | 2011-209372 | 10/2011 |
| JP | 2015-34767 A | 2/2015 |

\* cited by examiner

MAP INFORMATION CREATING DEVICE, NAVIGATION SYSTEM, INFORMATION DISPLAY METHOD, INFORMATION DISPLAY PROGRAM, AND RECORDING MEDIUM

TECHNICAL FIELD

This disclosure relates to a map information creating device, a navigation system, an information display method, an information display program, and a recording medium, and particularly, to a map information creating device, a navigation system, an information display method, an information display program, and a recording medium that can enable use of point of interest (POI) information of a POI.

BACKGROUND

Conventionally, a navigation system that can display POI information of a POI, which is a specific place or facility considered to be of use or interest to someone, on a monitor is known.

A navigation system that acquires POI data on a POI having a high popularity level within a predetermined range from a current position of a vehicle and displays an icon as POI information at a corresponding position on a map on a monitor so that the icon can be selected as a transit point candidate on the basis of the POI data is known such as, for example, Japanese Patent Application Publication No. 2015-034767 (JP 2015-034767 A).

A navigation system that can accurately display a position of an icon of a POI to show on which side of a road in a width direction the position is located is also known such as, for example, Japanese Patent Application Publication No. 2011-058960 (JP 2011-058960 A).

SUMMARY

However, all such navigation systems disclose a display of an icon indicating a position of a POI, for example, similarly to display of an icon indicating a gas station or a parking lot. Such an icon is displayed, for example, when a display area of the monitor under route guidance reaches a position including the POI.

Therefore, since an icon of a POI located within a predetermined distance (within a predetermined direct distance) from a current position of a vehicle is displayed, the road environment at the current position of the vehicle and the actual position of the POI are not considered.

Accordingly, since there may be a difference between the required time predicted from a direct distance on a display screen and the actual required time, a user may have the impression that they "should not have gone" because the route was indirect and took more time than expected or that they "should have gone" because the road conditions are better than expected and, thus, such information may not be convenient for the user.

Therefore, it is considered possible to improve convenience for a user, for example, by automatically displaying POI information at a predetermined time instead of simply displaying an icon such that a user can visit even an unscheduled destination without any burden in consideration of actual road conditions around the POI.

At this time, it is possible to further improve convenience for a user by predicting a traveling direction, passage of neighborhood of a POI or the like and creating POI information to automatically determine a predetermined timing (visibility and safety) that can be visually recognized without using a uniform distance for each POI.

We provide a map information creating device, a navigation system, an information display method, an information display program, and a recording medium that can improve convenience for a user by automatically setting presentation of POI information at a predetermined timing for each POI.

We also provide a map information creating device including: a storage unit that stores POI data including point data about a POI, node data of nodes set on roads in advance, and link data of links connecting the neighboring nodes; a specification unit that specifies one link located at a shortest distance from the POI among the links for each of a plurality of directions; and a determination unit that sets one of the nodes included in the specified links as a specific point and determines a predetermined area centered on the POI and passing through the specific point as a presentation target range of POI information.

We thus make it possible to improve convenience for a user by automatically setting presentation of POI information at a predetermined timing for each POI.

DETAILED DESCRIPTION

An example of our device, system, method, program and medium will be described below with reference to the accompanying drawings.

Our navigation system according to the example is applied to a navigation system for a vehicle. The navigation system may be applied to a navigation system for a portable terminal such as a smartphone or a tablet terminal. In the following description, "data" refers to electronic data in the form of codes stored (including temporarily) in a recording medium and processed by a control circuit. On the other hand, "information" refers to output information such as an image (text or patterns) displayed on a display screen or a voice output from a speaker as a processing result of the control circuit based on the data, except that "information" is used as a denomination.

Figure 1:
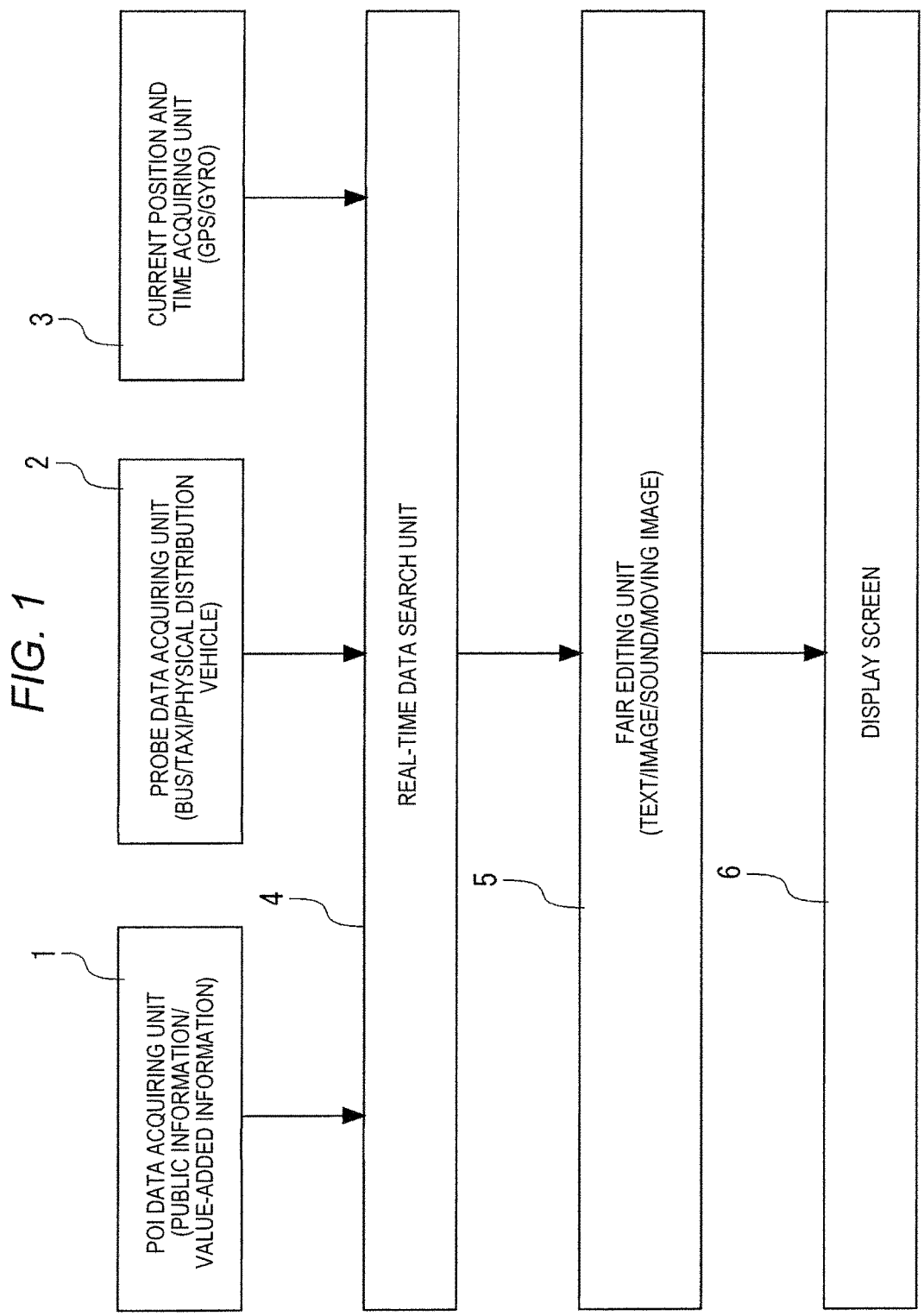
FIG. 1 is a block diagram illustrating an example in which POI data is acquired in a navigation system according to an example.

As illustrated in FIG. 1, the navigation system according to the example includes a POI data acquiring unit 1 that acquires, for example, public data about public facilities and value-added data about specific places and facilities considered to be of use or interest to someone as POI data. Then, the POI data acquired by the POI data acquiring unit 1 may be existing data acquired in advance and stored in a recording medium or may be data acquired via a communication unit such as an appropriate electric communication line every time. The recording medium may be a recording medium constituted of a memory circuit disposed in a navigation device as an onboard device or may be a recording medium, a CD-ROM, a DVD-ROM or the like constituted of an attachable/detachable memory circuit read by a reading unit disposed in the navigation device. The POI data stored in the recording medium can be updated sequentially or at a predetermined timing.

The navigation system includes a probe data acquiring unit 2 that acquires probe information including road traffic information as probe data. The probe information includes a variety of road traffic information such as traffic jam information from a known vehicle information and communication system (VICS (registered trademark)), necessary time, accident/disabled car/work information, speed control/lane regulation, position of a parking lot, and information on whether a parking lot/service area/parking area is full or empty. The probe information further includes probe information including road traffic information such as a current traffic jam state transmitted from buses, taxis, physical distribution vehicles and the like in addition to probe information provided from an information provider. Then, the probe data acquired by the probe data acquiring unit 2 may be existing data acquired in advance and stored in a recording medium or may be data acquired via a communication unit such as an appropriate electric communication line every time.

The navigation system includes a current position and time acquiring unit 3 that acquires a current position and a current time from a unit mounted on the vehicle or the navigation device or the like. Then, as the current time, the current position and time acquiring unit 3 acquires time data from a clocking timer or a radio timepiece that receives time information based on an atomic clock transmitted from a transmitter station of standard radio waves. As the current position, the current position and time acquiring unit 3 acquires current position data from a Global Positioning System (simply referred to hereinafter as "GPS") receiver mounted on the vehicle or the navigation device, a gyro or the like.

A variety of data acquired from the POI data acquiring unit 1, the probe data acquiring unit 2, and the current position and time acquiring unit 3 is searched for POI data and probe data based on the current position and the current time by a real-time data search unit 4 and the search result is output to a fair editing unit 5.

The fair editing unit 5 appropriately edits the POI data and the probe data searched for by the real-time data search unit 4 to display the data to overlap map information based on map data currently displayed on a display screen 6, to divide the screen to divisionally display the data or the like and outputs the data to the display screen 6.

Accordingly, in addition to the map information, POI information based on the POI data and probe information based on the probe data is displayed on the display screen 6.

The system that displays the POI information or the probe information functions to perform basic display functions in the example and this disclosure is not limited to the system.

Figure 2:
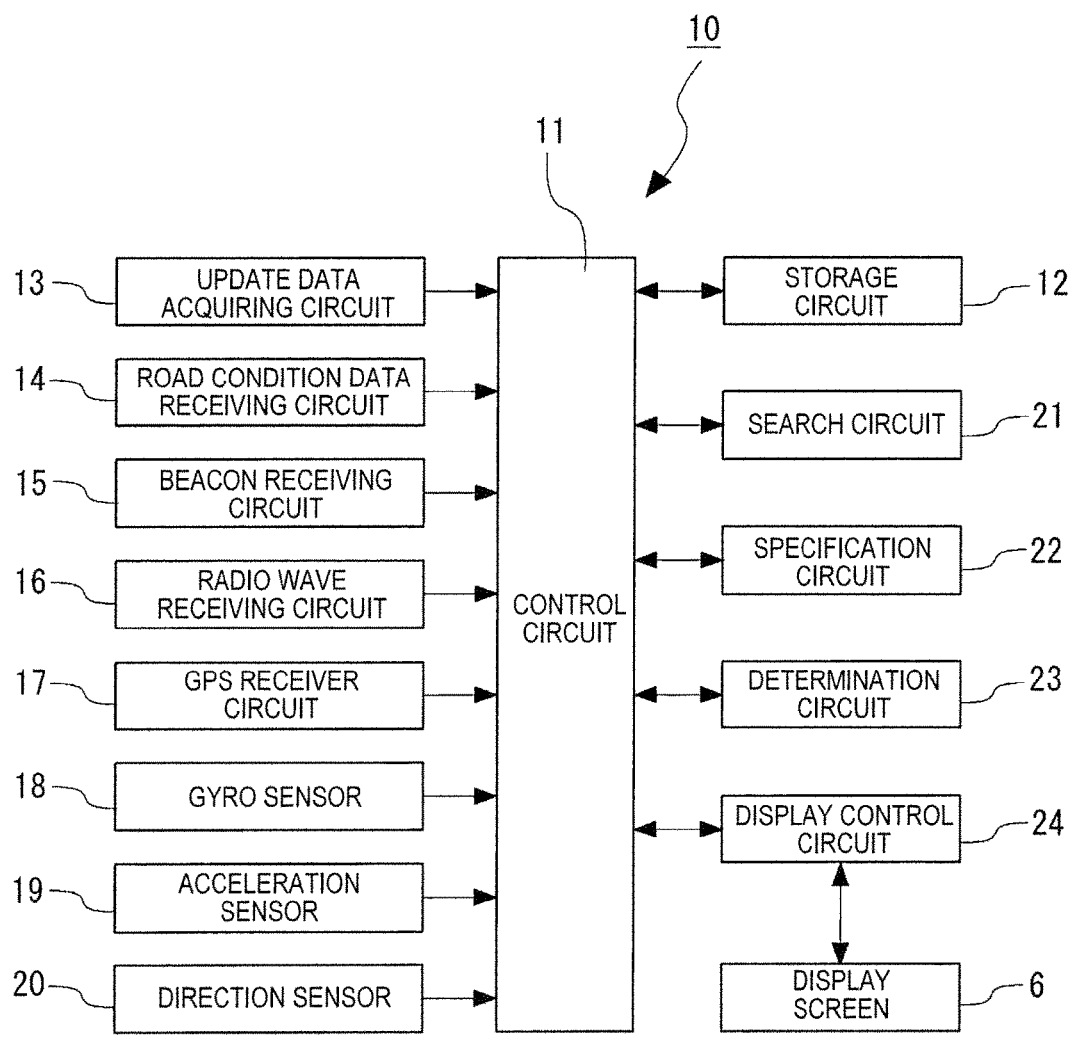
FIG. 2 is a diagram illustrating a control block in the navigation system according to the example.

A control block in a navigation system 10 according to the example will be described below with reference to FIG. 2.

In the navigation system 10, a computer is constituted of a control circuit 11 and a storage circuit 12. The control circuit 11 performs various processes on the basis of programs for the entire navigation system stored in the storage circuit 12 and programs to realize a map information creating function and a display function thereof according to the example.

The storage circuit 12 corresponds to the above-mentioned recording medium, can use a large-capacity recording medium such as a hard disk drive as a main memory circuit, and can re-store a variety of primary storage information in a recording medium such as a flash memory and use the recording medium as a sub memory circuit. The storage circuit 12 stores POI data including point data about POI according to the example. The variety of primary storage information may be primarily stored in a recording medium such as a flash memory instead of the storage circuit 12.

For example, various data from an update data acquiring circuit 13 including the POI data acquiring unit 1 that acquires the POI data or the like based on the current position, a road condition data receiving circuit 14 that receives road condition data including road traffic information from the vehicle information and communication system, a beacon receiving circuit 15 that receives a beacon signal, a radio wave receiving circuit 16 that receives radio waves (particularly for expressways), a GPS receiver circuit 17 that receives a GPS signal, a gyro sensor 18 that receives a gyro sensor signal corresponding to travel of the vehicle, an acceleration sensor 19 that receives an acceleration signal of the vehicle, and a direction sensor 20 that detects directions of north, south, east, and west and receives a direction signal is input to the control circuit 11. Known methods can be used as a method of detecting various data or the like.

The road condition data receiving circuit 14, the beacon receiving circuit 15, and the radio wave receiving circuit 16 constitute a part of the probe data acquiring unit 2. The GPS receiver circuit 17, the gyro sensor 18, the acceleration sensor 19, and the direction sensor 20 constitute a part of the current position and time acquiring unit 3.

Figure 3:
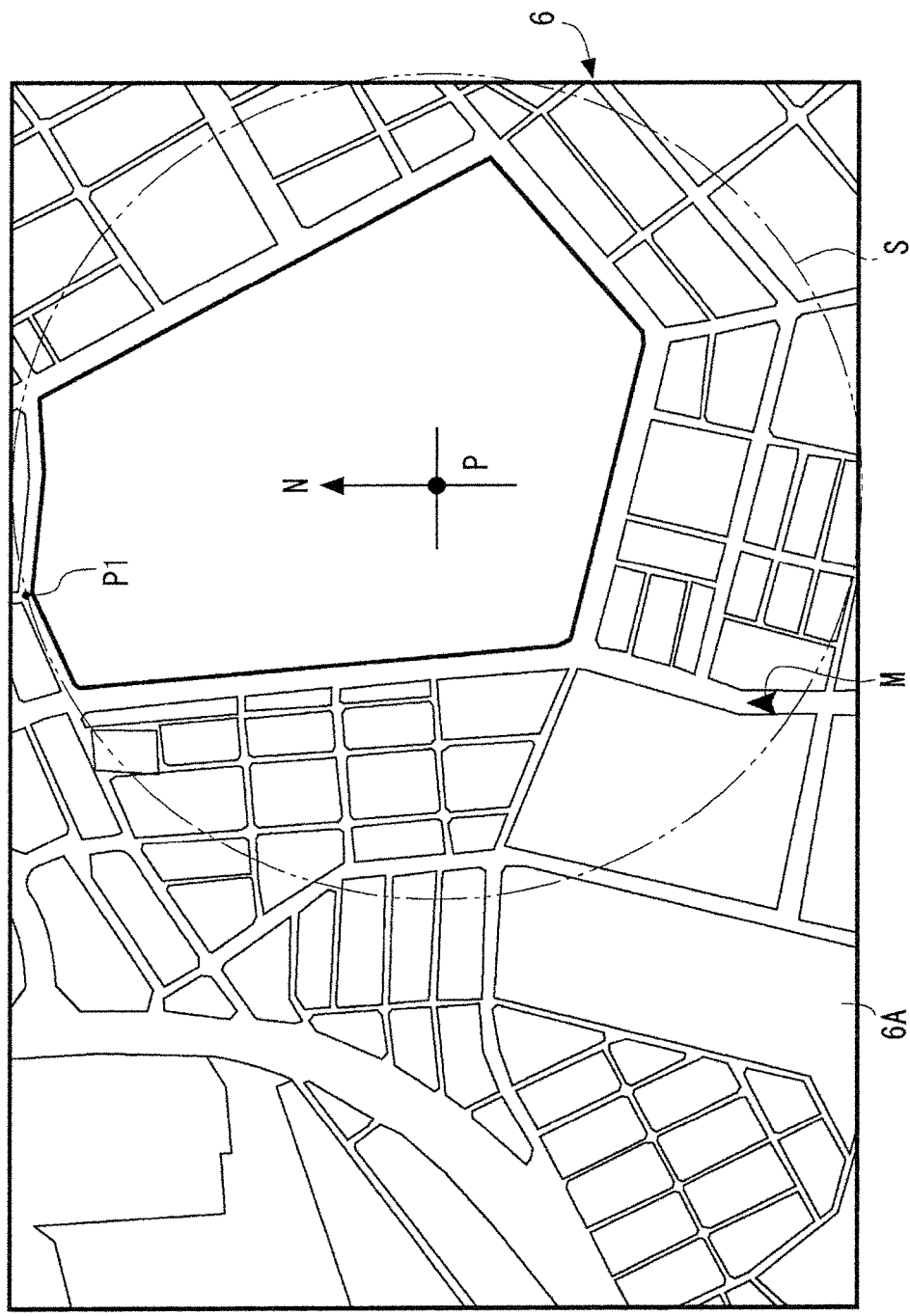
FIG. 3 is a diagram illustrating a display screen during normal travel in the navigation system according to the example.

On the basis of the input data, the control circuit 11 controls a search circuit 21 to refer to map data stored in the storage circuit 12 at normal times, and displays a navigation screen in which map information based on the current position and a vehicle position mark M are superimposed on each other as a main screen 6A on the entire display screen 6, for example, as illustrated in FIG. 3. In this case, it is assumed that route guidance to a previously input destination is not carried out.

The map data stored in the storage circuit 12 includes node data of nodes set on roads in advance and link data of links that connect the neighboring nodes. Accordingly, the search circuit 21 can display road information corresponding to actual roads including local roads on the display screen 6. The search system and the display developing system using nodes and links are known.

The control circuit 11 controls a specification circuit 22 that specifies a link located at a shortest distance from a POI for each of a plurality of directions among the links, a determination circuit 23 that determines a predetermined area centered on the POI and passing through a specific point as a presentation target range of POI information using one of a plurality of nodes included in the specified links as the specific point, and a display control circuit 24 that displays POI data including point data about a POI as POI information on the display screen 6 with entrance of the current position into the presentation target range as a trigger.

Figure 4:
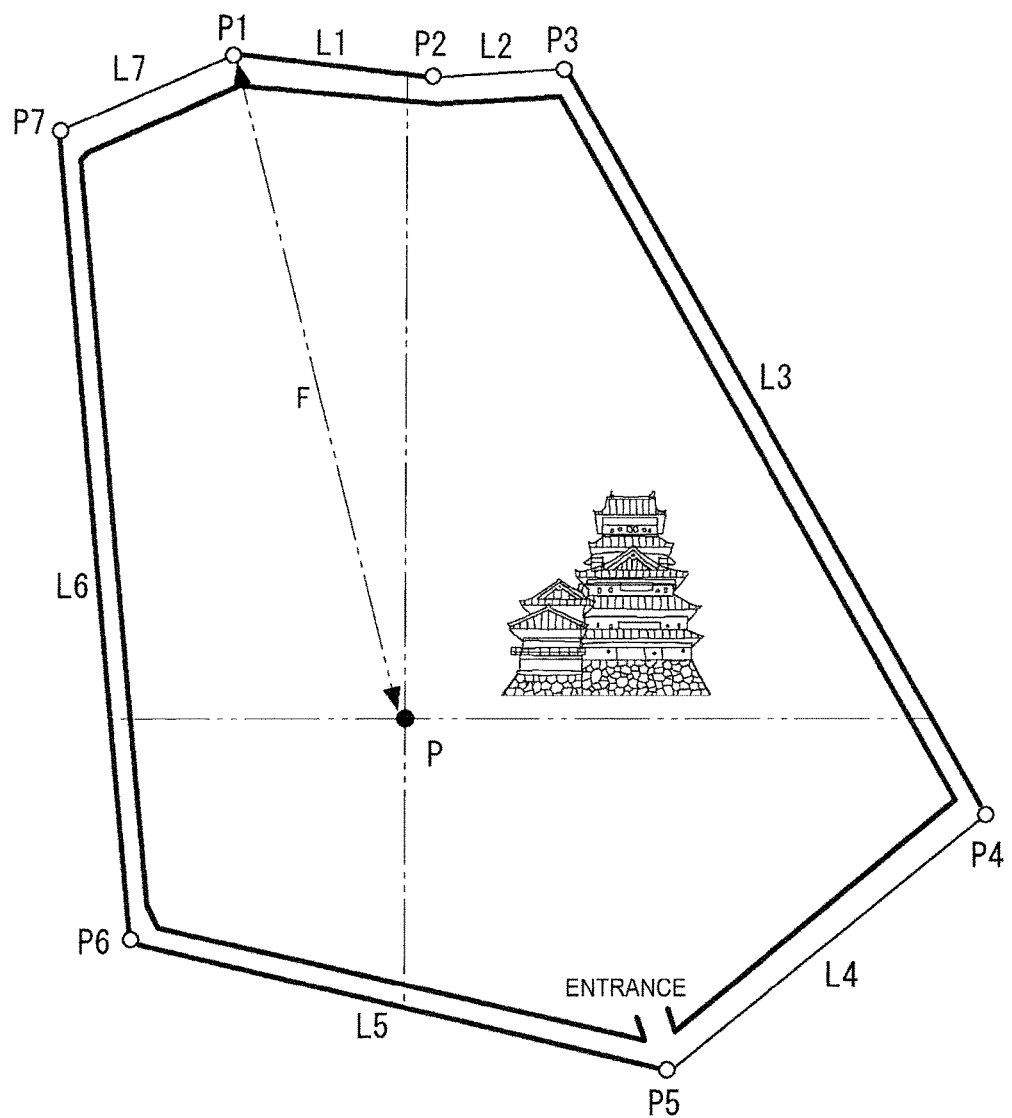
FIG. 4 is a diagram illustrating an example in which a presentation target range of POI information is determined in the navigation system according to the example.

When a castle is present as a POI as illustrated in FIG. 4, it is assumed that the castle is surrounded by a plurality of links (roads) L1 to L7 with the castle or a parking lot thereof as a reference (center P). Accordingly, nodes P1 to P7 that are shared by neighboring links are set at both ends of each of the links L1 to L7.

The specification circuit 22 specifies the links L1, L3, L5, and L6 that are located in four directions of north, south, east, and west from the center P. Among these, the determination circuit 23 determines the node P1 having the largest direct distance from the center as a specific point among the nodes P1, P2, P3, P4, P5, P6, and P7 of the links L1, L3, L5, and L6 and determines a circle S of which a radius from the center P passes through the specific point (the node P1) as the presentation target range, for example, as illustrated in FIG. 3. The presentation target range may not be a circle S. The center P, the specific point (the node P1), and the circle S are not actually displayed on the display screen 6.

Figure 5:
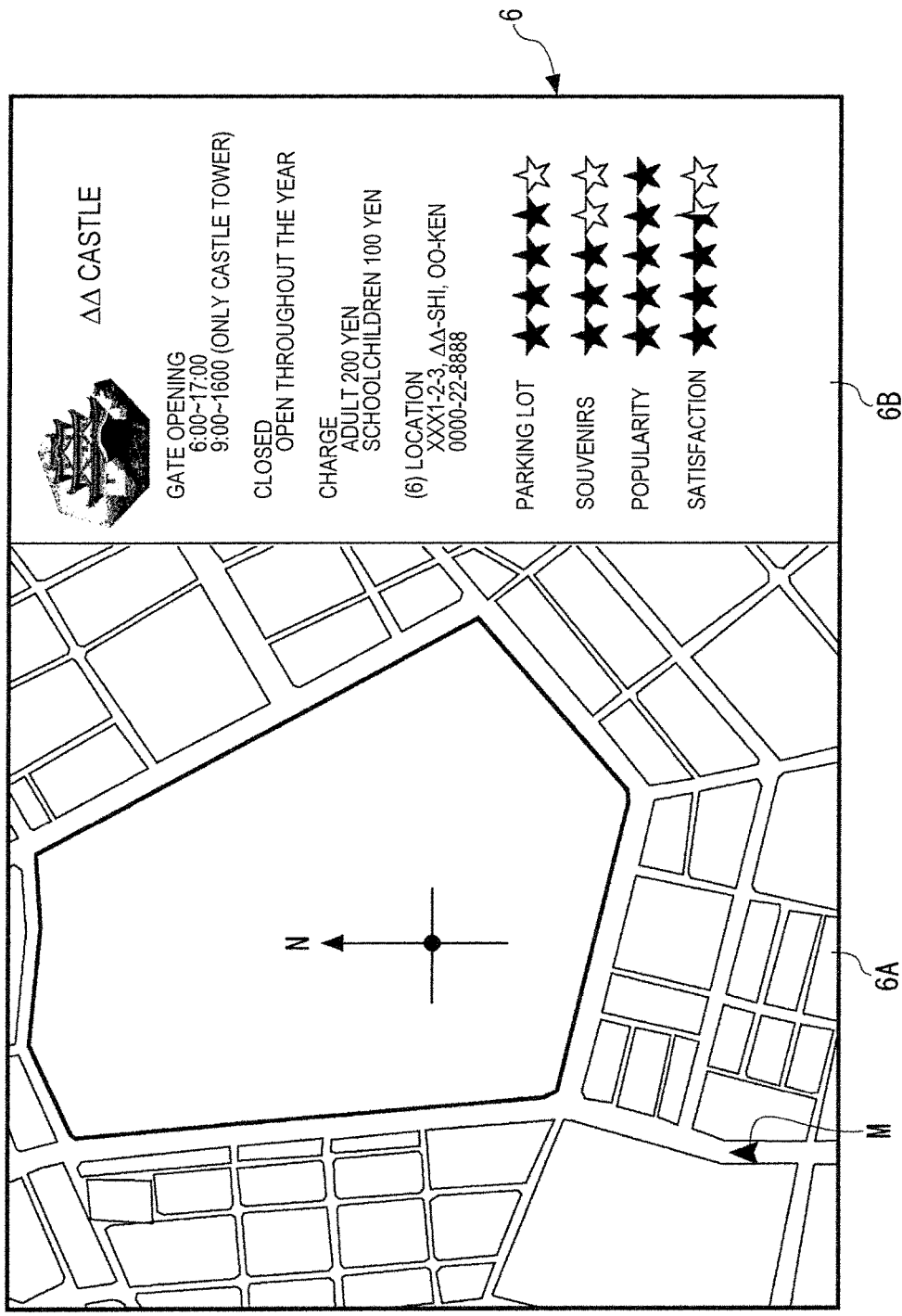
FIG. 5 is a diagram illustrating an example in which POI information is displayed in our navigation system.

With entrance of the traveling vehicle (the vehicle position mark M) into the circle S which is the presentation target range as a trigger, as illustrated in FIG. 5, the display control circuit 24 divides the display screen 6 into a main screen 6A and a sub screen 6B at a predetermined ratio, displays road information including the vehicle position mark M displayed before the division on the main screen 6A, and displays the POI information on the sub screen 6B.

In this way, a map information creating device according to the example includes the storage circuit 12 that stores POI data including the point data about a POI, node data of the nodes P1 to P7 set on the roads in advance, and link data of the links L1 to L7 connecting the neighboring nodes P1 to P7, the specification circuit 22 that specifies the links L1, L3, L5, and L6 located at the shortest distance from the POI for each of a plurality of directions among the links L1 to L7, and the determination circuit 23 that sets one of the nodes P1, P2, P3, P4, P5, P6, and P7 included in the specified links L1, L3, L5, and L6 as a specific point P1 and determines a predetermined area centered on the POI (the center P) and passing through the specific point P1 as the presentation target range S of the POI information, and can be incorporated in the navigation system 10. When the POI data is created in advance, the map information creating device may be configured as a device independent of the navigation system.

In this basic configuration, since the navigation system 10 according to the example includes the storage circuit 12 that stores the POI data including the point data about a POI, the node data of the nodes P1 to P7 set on the roads in advance, and the link data of the links L1 to L7 connecting the neighboring nodes P1 to P7, the specification circuit 22 that specifies the links L1, L3, L5, and L6 that are located at the shortest distance from the POI for each of a plurality of directions among the links L1 to L7, the determination circuit 23 that sets one of the nodes P1, P2, P3, P4, P5, P6, and P7 included in the specified links L1, L3, L5, and L6 as a specific point P1 and determines a predetermined area centered on the POI (the center P) and passing through the specific point P1 as the presentation target range S of the POI information, the current position and time acquiring unit 3 that acquires current position information indicating the current position, and the display screen 6 that presents the POI data including the point data about the POI with entrance of the current position into the presentation target range S as a trigger, it is possible to improve convenience for a user by automatically setting presentation of POI information at a predetermined timing for each POI.

Figure 6:
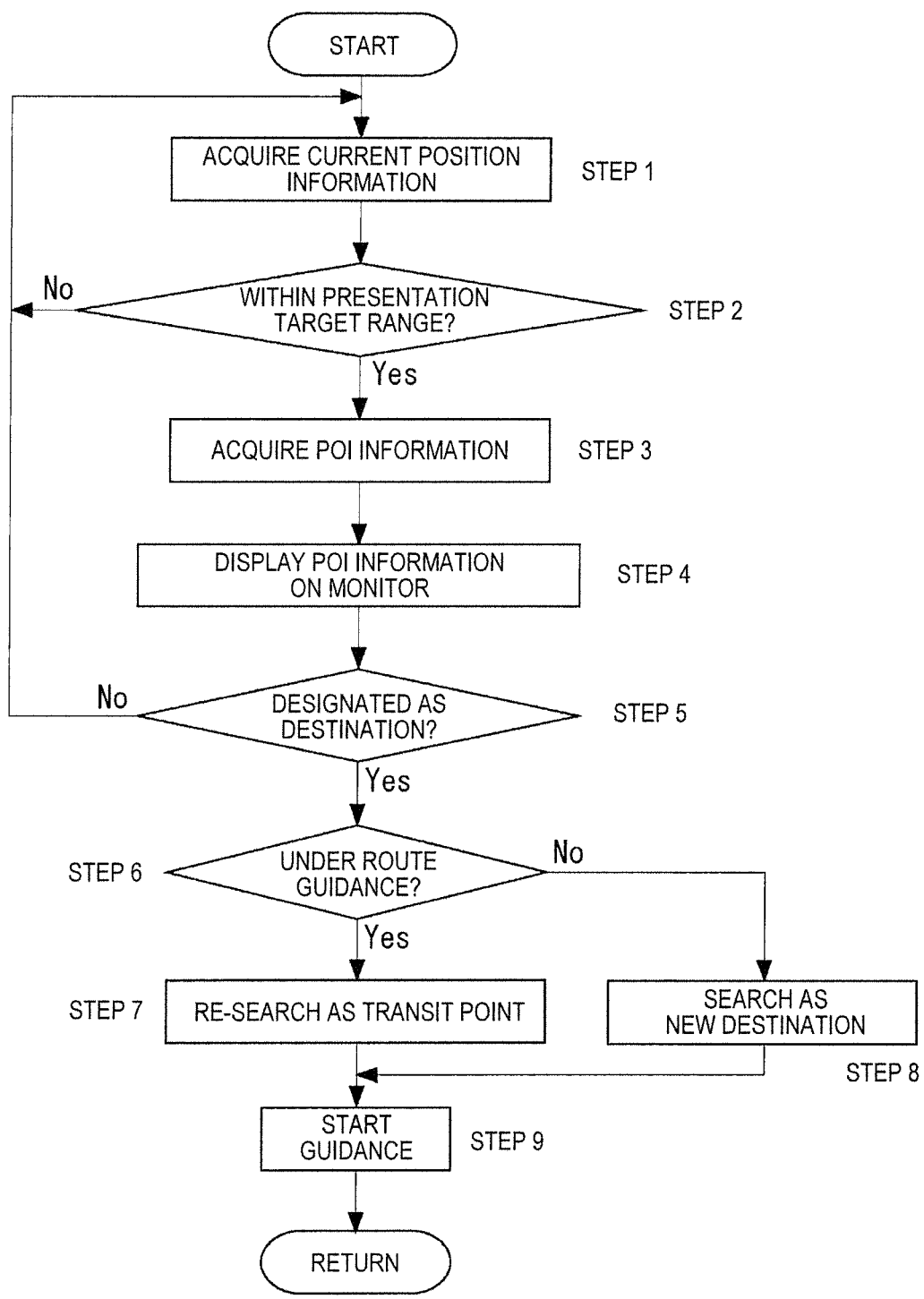
FIG. 6 is a flow diagram illustrating a control routine in the navigation system according to the example.

A control routine performed by the control circuit 11 according to the example will be described below with reference to the flow diagram illustrated in FIG. 6.

Step S1

In Step S1, the control circuit 11 controls the current position and time acquiring unit 3 to acquire current position information and current time data and to temporarily store the acquired data in the storage circuit 12 and then performs Step S2.

Step S2

In Step S2, the control circuit 11 determines whether the vehicle position has entered the presentation target range S. The control circuit 11 performs Step S3 when it is determined that the vehicle position has entered the presentation target range S (YES), maintains a normal road display state (or a route guidance state) and performs Step S1 again when it is determined that the vehicle position has not entered the presentation target range S (NO).

Step S3

In Step S3, the control circuit 11 acquires POI information (POI data) of the presentation target range S from the storage circuit 12, outputs the POI information to the display control circuit 24, and then performs Step S4.

Step S4

In Step S4, the control circuit 11 controls the display control circuit 24 to divide the display screen 6 into the main screen 6A and the sub screen (monitor) 6B and to display the road information and the POI information on the screens 6A and 6B and then performs Step S5.

Step S5

In Step S5, for example, the control circuit 11 determines whether a destination determination button included in the POI information displayed on the sub screen 6A (in the case of a touch panel type liquid crystal screen) is designated and operated within a predetermined time or within a predetermined traveling distance. The control circuit 11 performs Step S6 when it is determined that the destination determination button is designated and operated (that is, a destination or a transit point is designated), and cancels display of the POI information with the lapse of a predetermined time or after traveling a predetermined distance and then performs Step S1 again when it is determined that the destination determination button is not designated nor operated.

Step S6

In Step S6, the control circuit 11 determines whether route guidance is carried out. The control circuit 11 performs Step S7 when it is determined that route guidance is performed (YES), and performs Step S8 when it is determined that route guidance is not performed (NO).

Step S7

In Step S7, since it is determined in Step S6 that the POI is added as a new transit point during route guidance, the control circuit 11 controls the search circuit 21 to re-search for a route to the POI as a transit point including a destination and then performs Step S9.

Step S8

On the other hand, in Step S8, since it is determined in Step S6 that the POI is designated as a new destination, the control circuit 11 controls the search circuit 21 to search for a route to the POI as a destination and then performs Step S9.

Step S9

In Step S9, the control circuit 11 controls the display control circuit 24 to display the route re-searched for in Step S7 or the route searched for in Step S8 on the display screen 6 and then ends the routine.

Accordingly, the route from the current position to the POI as a transit point or a destination is displayed on the display screen 6 and route guidance including known voice guidance or the like is started.

In the above-described example, the presentation target range is set to the circle S and the determination circuit 23 determines the presentation target range S using the farthest node P1 of the link L1 as the specific point when the direct distance between the farthest node P1 of the link L1 located farthest from the POI among the nodes P1 to P7 of the links L1 to L7 specified by the specification circuit 22 and the POI is equal to or less than a predetermined distance, but the display timing of the POI information may vary greatly depending on the position of the POI or the road conditions.

Therefore, when the direct distance F between the farthest node P1 of the link L1 located farthest from the POI among the nodes P1 to P7 of the links L1 to L7 specified by the specification circuit 22 and the POI is equal to or more than a predetermined distance, the determination circuit 23 may assume a node separated a prescribed distance as the specific point and determine the presentation target range S of the POI information. The predetermined distance and the prescribed distance may be different from each other or may be equal to each other (for example, 300 m).

Accordingly, when the vehicle approaches the POI as near as possible or when the POI can be visually recognized with eyes, the POI information can be displayed on the display screen 6.

When the total distance from the POI (the center P=the parking lot) to the farthest node P1 of the link L1 located farthest from the POI is equal to or less than a predetermined distance, the determination circuit 23 may determine the presentation target range S of POI information using the farthest node P1 of the link L1 located farthest from the POI as the specific point.

Accordingly, for example, when there is one link connected to the POI and the vehicle has to take a large detour from the current position to the POI (the center P=the parking lot), inconvenience can be avoided until the vehicle further approaches the POI and the current position gets close to the POI within the predetermined distance.

Figure 7:
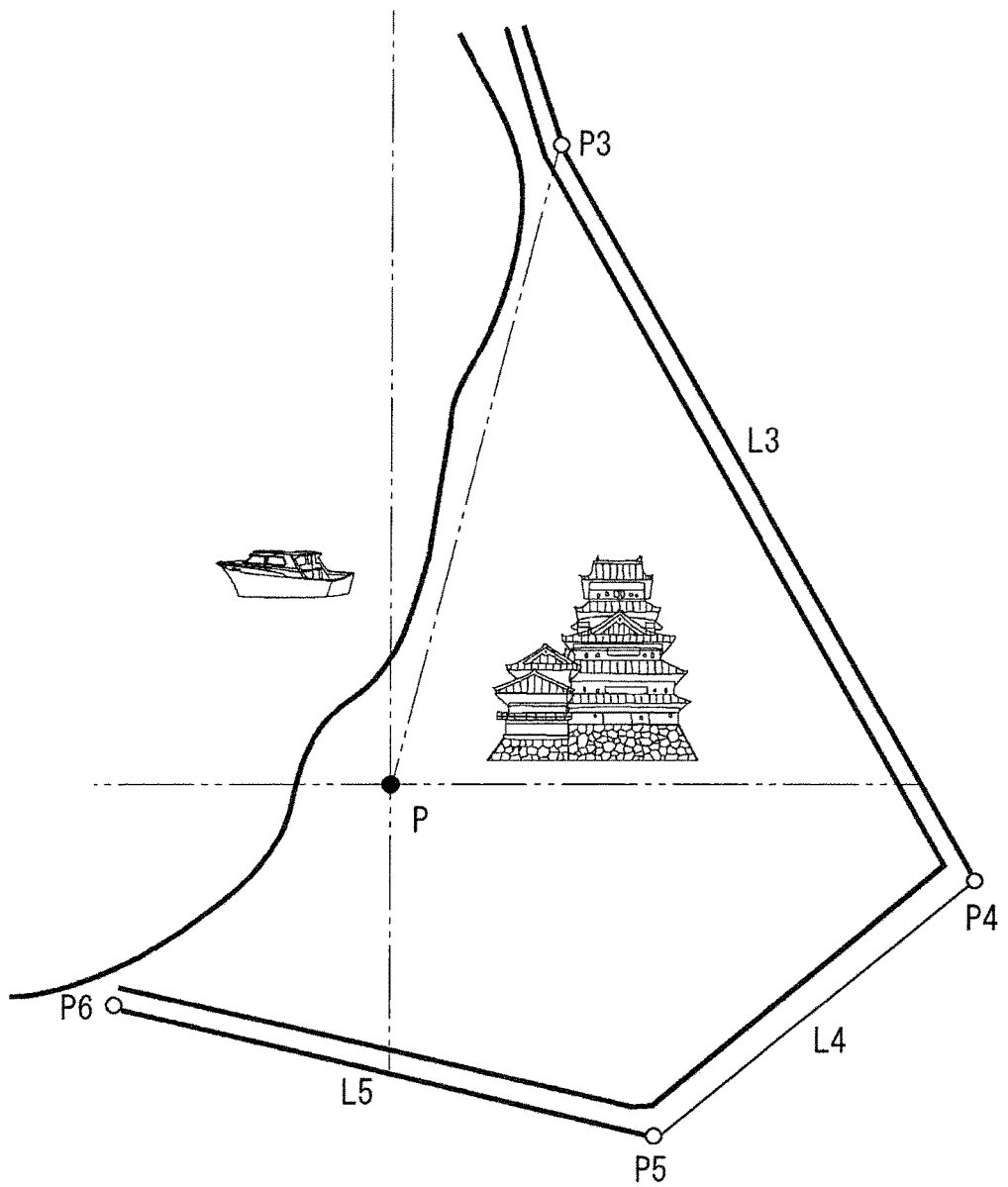
FIG. 7 is a diagram illustrating an example in which a presentation target range of other POI information is determined in our navigation system.

Then, the predetermined distance or the prescribed distance can be applied even when a sea, a mountain, a river, a lake or the like is near the POI and there are no links surrounding the POI or when a link in an orientation direction is located at a distant position such as the opposite shore as illustrated in FIG. 7. In this case, when there is no link within a predetermined distance among the links around the POI, the determination circuit 23 may determine the presentation target range S of POI information on the assumption that the farthest node P3 of the link L3 located farthest is the specific point as for the link L3 and the link L5 within a predetermined distance.

Accordingly, when the total distance of the links L5 to L3 from the POI (the center P=the parking lot) to the farthest node P3 of the link L3 assumed to be located farthest from the POI is equal to or greater than a predetermined distance, the determination circuit 23 may determine the presentation target range S of POI information on the assumption that a node at a prescribed distance is the specific point.

The distance such as the above-mentioned predetermined distance or the above-mentioned prescribed distance may be uniformly set to a simple distance or may be set depending on the surrounding road environment of the POI. For example, when there are links that surround the POI, that is, when the vehicle can travel to the POI using at least one of the links L1 to L7 in any direction, ½ or ⅓ of the total distance of all the links L1 to L7 surrounding the POI may be set as the predetermined distance or the prescribed distance.

It is preferable that surrounding environment information including an area of an installation location, geographical features, and three-dimensional shapes of buildings, in addition to the latitude/longitude and facility information, be stored as POI data including point data about the POI in the storage circuit 12.

Accordingly, the determination circuit 23 can display the POI information on the display screen 6 when the vehicle approaches the POI as near as possible or when the POI can be visually recognized by eye, by setting a virtual visible area in which the POI can be visually recognized from the current position in consideration of the surrounding environment information, then comparing the virtual visible area with the presentation target range S of POI information, and changing the presentation target range S of POI information on the basis of the comparison result.

The display control circuit 24 may display the POI information based on the POI data on the display screen 6 on the condition that the vehicle stops or travels at a predetermined speed or less using a speed sensing signal from the acceleration sensor 19.

As described above, our navigation system can improve convenience for a user by automatically setting presentation of POI information at a predetermined timing for each POI, and the functionality can be usefully applied to a map information creating device, a navigation system, an information display method, an information display program, and a recording medium that can use POI information on a POI as a whole.

What is claimed is:

1. A map information creating device comprising:
  a storage unit that stores POI data including point data about a POI, node data of nodes set on roads in advance, and link data of links connecting neighboring nodes;
  a specification unit that specifies one link located at a shortest distance from the POI among links for each of a plurality of directions;
  a determination unit that sets one of the nodes included in the specified links as a specific point and determines a predetermined area centered on the POI and passing through the specific point as a presentation target range of POI information;
  wherein the determination unit determines the presentation target range of POI information using a farthest node of the link located farthest from the POI as the specific point when a direct distance between the farthest node of the link located farthest from the POI among the nodes of the links specified by the specification unit and the POI is equal to or less than a predetermined distance; and
  the determination unit determines the presentation target range of POI information on an assumption that the node at a prescribed distance is the specific point when a direct distance between a farthest node of the link located farthest from the POI among the nodes of the links specified by the specification unit the POI is equal to or greater than a predetermined distance.

2. A navigation system comprising:
  a storage unit that stores POI data including point data about a POI, node data of nodes set on roads in advance, and link data of links connecting neighboring nodes;
  a specification unit that specifies one link located at a shortest distance from the POI among links for each of a plurality of directions;

a determination unit that sets one of the nodes included in the specified links as a specific point and determines a predetermined area centered on the POI and passing through the specific point as a presentation target range of POI information;

an acquisition unit that acquires current position information indicating a current position;

a presentation unit that presents POI data including the point data about the POI with entrance of the current position into the presentation target range as a trigger;

wherein the determination unit determines the presentation target range of POI information using a farthest node of the link located farthest from the POI as the specific point when a direct distance between the farthest node of the link located farthest from the POI among the nodes of the links specified by the specification unit and the POI is equal to or less than a predetermined distance; and the determination unit determines the presentation target range of POI information on an assumption that the node at a prescribed distance is the specific point when a direct distance between a farthest node of the link located farthest from the POI among the nodes of the links specified by the specification unit the POI is equal to or greater than a predetermined distance.

3. The navigation system according to claim 2, wherein the determination unit determines the presentation target range of POI information using a farthest node of the link located farthest from the POI as the specific point when a total distance of the links to the farthest node of the link located farthest from the POI is equal to or less than a predetermined distance.

4. The navigation system according to claim 3, wherein the determination unit determines the presentation target range of POI information on an assumption that the node at a prescribed distance is the specific point when a total distance of the links to the farthest node of the link located farthest from the POI is equal to or greater than a predetermined distance.

5. The navigation system according to claim 2, wherein the determination unit determines the presentation target range of POI information on an assumption that the node at a prescribed distance is the specific point when a total distance of the links to the farthest node of the link located farthest from the POI is equal to or greater than a predetermined distance.

6. The navigation system according to claim 2,
wherein the storage unit stores surrounding environment information including an area of an installation location, geographical features, and three-dimensional shapes of buildings in addition to latitude/longitude and facility information as the POI data including the point data about the POI, and the determination unit sets a virtual visible area in which the POI is visually recognized from the current position in consideration of the surrounding environment information, compares the virtual visible area with the presentation target range of POI information, and changes the presentation target range of POI information on the basis of the comparison result.

7. The navigation system according to claim 2, wherein the presentation unit displays POI information based on the POI data on the condition that a vehicle stops or travels at a predetermined speed or less.

8. An information display method causing a computer to perform:
storing POI data including point data about a POI, node data of nodes set on roads in advance, and link data of links connecting neighboring nodes;
specifying one link located at a shortest distance from the POI among links for each of a plurality of directions;
setting one of the nodes included in the specified links as a specific point and determining a predetermined area centered on the POI and passing through the specific point as a presentation target range of POI information;
acquiring current position information indicating a current position;
presenting POI data including the point data about the POI with entrance of the current position into the presentation target range as a trigger;
wherein the determination unit determines the presentation target range of POI information using a farthest node of the link located farthest from the POI as the specific point when a direct distance between the farthest node of the link located farthest from the POI among the nodes of the links specified by the specification unit and the POI is equal to or less than a predetermined distance; and
the determination unit determines the presentation target range of POI information on an assumption that the node at a prescribed distance is the specific point when a direct distance between a farthest node of the link located farthest from the POI among the nodes of the links specified by the specification unit the POI is equal to or greater than a predetermined distance.

9. A non-transitory recording medium having recorded thereon an information display program to cause a computer to perform:
storing POI data including point data about a POI, node data of nodes set on roads in advance, and link data of links connecting neighboring nodes;
specifying one link located at a shortest distance from the POI among links for each of a plurality of directions;
setting one of the nodes included in the specified links as a specific point and determining a predetermined area centered on the POI and passing through the specific point as a presentation target range of POI information;
acquiring current position information indicating a current position;
presenting POI data including the point data about the POI with entrance of the current position into the presentation target range as a trigger;
wherein the determination unit determines the presentation target range of POI information using a farthest node of the link located farthest from the POI as the specific point when a direct distance between the farthest node of the link located farthest from the POI among the nodes of the links specified by the specification unit and the POI is equal to or less than a predetermined distance; and
the determination unit determines the presentation target range of POI information on an assumption that the node at a prescribed distance is the specific point when a direct distance between a farthest node of the link located farthest from the POI among the nodes of the links specified by the specification unit the POI is equal to or greater than a predetermined distance.

* * * * *